(12) United States Patent
Bang et al.

(10) Patent No.: US 8,240,258 B2
(45) Date of Patent: Aug. 14, 2012

(54) BURNER FOR WASTE PLASTIC

(76) Inventors: William Hunkyun Bang, Seoul (KR);
Thomas Anthony Patti, Stockton, CA (US)

(*) Notice: Subject to any disclaimer, the term of this patent is extended or adjusted under 35 U.S.C. 154(b) by 801 days.

(21) Appl. No.: 12/367,462

(22) Filed: Feb. 6, 2009

(65) Prior Publication Data

US 2010/0199894 A1  Aug. 12, 2010

(51) Int. Cl.
*F23G 7/12* (2006.01)
*F23G 5/38* (2006.01)
*F23B 10/02* (2011.01)
*F23K 3/00* (2006.01)

(52) U.S. Cl. ........ 110/276; 110/225; 110/227; 110/230; 110/235; 110/246; 110/255; 110/295; 110/327

(58) Field of Classification Search .................. 110/110, 110/225, 226, 227, 228, 229, 230, 235, 246, 110/255, 256, 276, 295, 327, 346
See application file for complete search history.

(56) References Cited

U.S. PATENT DOCUMENTS 4,231,304 A * 11/1980 Hoskinson ................ 110/257
5,009,172 A * 4/1991 Koga et al. ............... 110/242

* cited by examiner

*Primary Examiner* — Kenneth Rinehart
*Assistant Examiner* — David J Laux
(74) *Attorney, Agent, or Firm* — Jerry R. Potts

(57) ABSTRACT

The present invention provides a burner which uses solid fuels, especially waste plastic fuels. Burner size is minimized by having multiple combustion chambers concentrically located around a rotating screw conveyor. Heat efficiency is improved by having air passages disposed around the combustion chambers, thus preheating air for the combustion prior to its delivery to the combustion chambers, while simultaneously thermally insulating the combustion chambers against the environment. Waste plastic is transported from a fuel hopper to the combustion chambers by a rotating screw conveyor having the spiraling auger blades. Speed of screw conveyor rotation controls the consumption of waste plastic and, thus, the amount of thermal energy generated in the burner.

21 Claims, 4 Drawing Sheets

BURNER FOR WASTE PLASTIC

BACKGROUND OF THE INVENTION

The present invention relates generally to solid fuel burners, especially burners for waste plastic. Considerable research effort has been invested toward finding methods of converting waste plastics to usable solid fuels as a means of plastic recycling. Waste plastics are burned to generate heat, which may be used for water heating, industrial heat, or other purposes. Important considerations related to waste plastics as fuel sources are: maximizing energy by burning the solid fuel completely, minimizing heat losses to the environment, compactness of the burner, and minimizing soot and harmful gases emission.

Some existing waste fuel burners have multiple combustion chambers, which improves the completeness of the burning, but the combustion chambers are arranged one after another, therefore resulting in a long burner and significant heat losses due to the exposed outer surfaces.

Other existing waste fuel burners accumulate ash, soil, and sand during the burning process. These burners have to be periodically stopped for the removal of accumulated non-combustible material.

There is therefore a need for solid waste burners that minimize burner size and heat losses, while maximizing the completeness of fuel burning. The burner should also minimize soot and harmful gases emission, while reducing the accumulation of the non-combustible material inside the burner.

BRIEF SUMMARY OF THE INVENTION

The present invention relates generally to burners that use solid fuels, especially waste plastic fuels. Burner size is minimized by having multiple combustion chambers arranged concentrically around a rotating screw conveyor. Heat efficiency is improved by having an air chamber disposed around the combustion chambers, because the air for the combustion is preheated prior to being delivered to the combustion chambers, while the air chamber at the same time thermally insulates the combustion chambers against the environment. Waste plastic is transported from a fuel hopper to the combustion chambers by a rotating screw conveyor having spiraling auger blades. Speed of the screw conveyor rotation controls the consumption of waste plastic and, hence, the amount of thermal energy generated in the burner. Parts of the combustion chambers can also rotate to auger waste plastic for better oxidation, therefore enhancing the combustion process.

In one embodiment, a burner for waste plastics has a rotatable feed mechanism for directing the waste plastic to a combustion unit. The burner has first, second and third combustion chambers substantially coaxially arranged with respect to the rotatable feed mechanism, the first combustion chamber being arranged to receive waste plastic from the feed mechanism. The burner has an outlet for discharging exhaust materials from the third combustion chamber.

In one aspect, the combustion chambers have approximately like axial extents, and the first through third combustion chambers are arranged radially one after the other so that the combustion unit has an overall axial length in the direction of the feed conveyor approximately equal to the lengths of an individual combustion chamber.

In another aspect, the burner includes radially oriented end walls arranged between adjacent combustion chambers and spaced apart from respective ends of the tubular walls for generating an S-shaped flow of combustible materials, combustion air, smoke and particulates from the first through the third combustion chambers.

In yet another aspect, the burner includes a screw conveyor having a hollow interior extending axially along the conveyor and into the combustion unit for directing combustion air to the combustion unit, and one or more orifices disposed radially from the longitudinal hollow interior and axially located on the screw conveyor so that the orifices discharge air to at least one combustion chamber.

In another aspect, the burner includes a housing surrounding the feed mechanism and the combustion unit including an air flow passage extending over substantially the full extent of the housing, thus insulating the burner against the thermal losses to the environment.

In yet another aspect, the apparatus for solid waste burning further has an auxiliary burner configured to start burning of waste fuel.

In another aspect, the apparatus for solid waste burning further has a fuel hopper configured to provide waste fuel to the auger shaft.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

DETAILED DESCRIPTION OF THE INVENTION

Figure 1A:
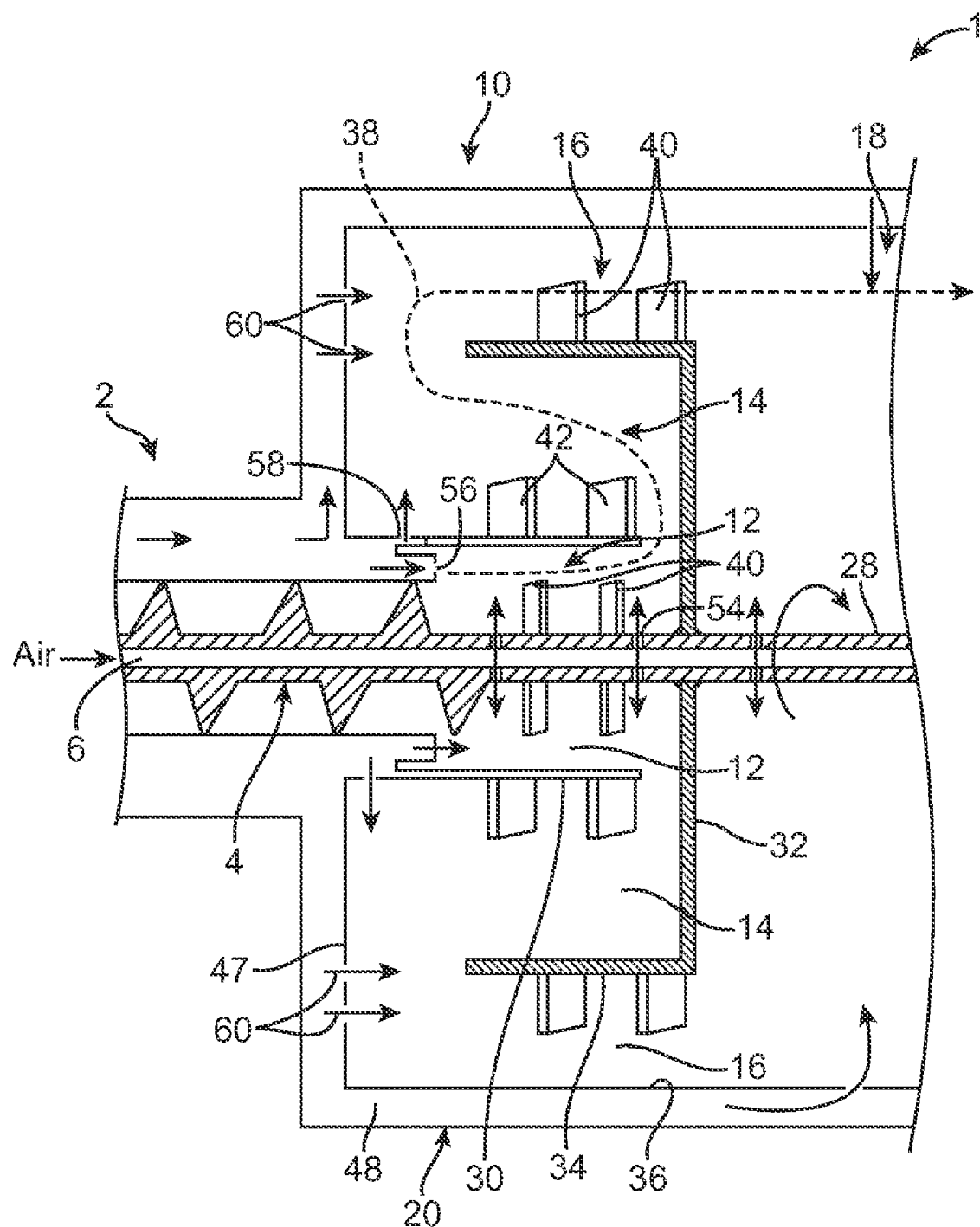
FIGS. 1A and 1B show partial sectional plan and right views, respectively, of one embodiment of the invention.
Figure 1B:
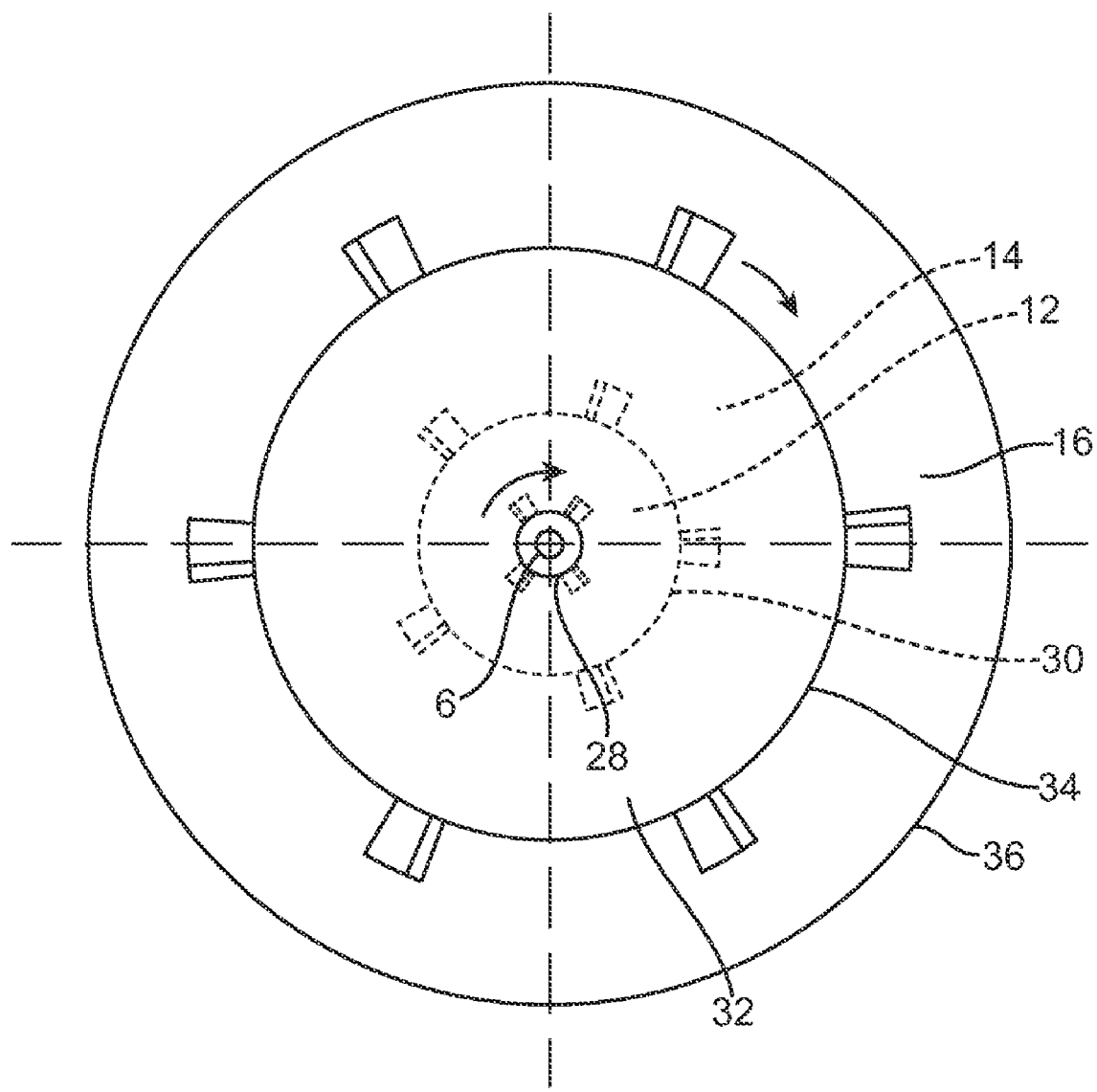
Figure 2:
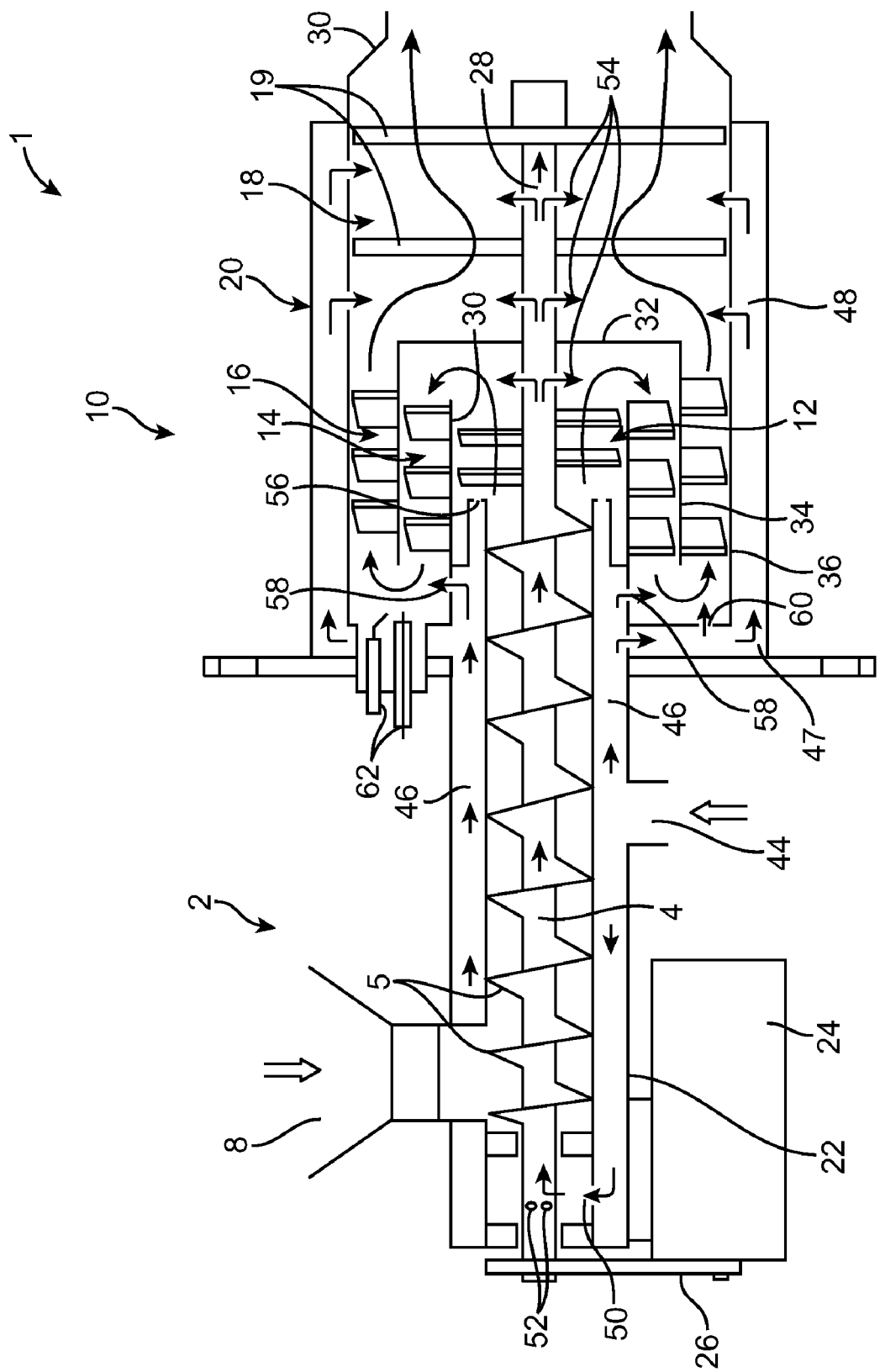
FIG. 2 shows a side sectional view of another embodiment of the invention.

Referring to FIGS. 1A, 1B, and 2, A burner 1 for waste material, particularly plastic waste, has a feed mechanism 2 defined by an elongated transport or conveyor screw 4 provided with a central lumen 6 extending substantially through the entire length of the transport screw. The screw is situated below an intake opening 8 of the feed mechanism and extends forwardly (to the right as seen in FIGS. 1A and 2) to a combustion unit 10 defined by a plurality of combustion chambers, for example, first, second and third combustion chambers 12, 14 and 16 that are coaxially disposed about conveyor screw 4 at an increasing radial distance from the conveyor screw. The downstream end of the third combustion chamber is in fluid communication with a discharge section 18 of the burner, which receives smoke and incombustible particulates from the combustion chambers and discharges them from the burner into the atmosphere. A double walled outer housing 20 defines an air passages 48, which surrounds a portion of the transport screw 4, the combustion unit 10 and the discharge section 18.

Feed mechanism 2 of burner 1 includes the earlier mentioned conveyor screw 4 with spiral windings 5 and a generally tubular, double walled housing portion 22, which surrounds the rotating screw 4. A motor 24 drives a shaft 28 of the screw 4 via a chain 26. Other suitable drives such as a gear drive, a belt drive or the like can be employed.

Intake opening 8 is arranged proximate to an upstream end of the screw (on the left as seen in FIG. 2) through which plastic waste or other material is entrained for conveyance in a downstream direction (to the right as seen in FIG. 2) towards combustion unit 10. The downstream end of shaft 28 of screw 4 is free of spiral windings and extends into the combustion unit where it is suitably journaled.

Combustion unit 10 is formed by the three concentric combustion chambers 12, 14, 16, each of which has inner and outer radial boundaries that are concentric with the axis of shaft 28 and interconnected by radially extending walls. In particular, the inside of first combustion chamber 12 is defined by the circumference of conveyor shaft 28 and its outside is defined by an extension 30 of the tubular housing portion 20 surrounding the conveyor screw. The inside of second combustion chamber 14 is defined by the exterior of the extension 30, and the outside of the second chamber is defined by a tubular wall 34 that is coaxial with and spaced apart from extension 30. An end wall 32 connected to and substantially perpendicular to tubular wall 34 is fixed to conveyor shaft 28, is axially spaced from a downstream end of extension 30, and forms a transition space between the first and second combustion chambers 12, 14. Finally, an exterior surface of tubular wall 34 defines the inside of third combustion chamber 16. The outside of the third combustion chamber is formed by the inside of housing 20. The transition space between the second and third chambers is provided by radial air passage 47 of housing 20. The downstream end of the third combustion chamber opens to discharge section 18 of the burner.

As is illustrated in FIG. 1A, gaseous material, particulates and the like from first combustion chamber 12 move along an S-shaped line 38, past the second and third combustion chambers, and into discharge section 18. To facilitate movement of the materials through the combustion chamber, auger plates 40, which are preferably inclined relative to the axis of shaft 28 to help advance the materials in a downstream direction, are suitably arranged on the inner radial surfaces of the first through third combustion chambers. In the embodiment illustrated in FIG. 2, the auger plates for the first and third combustion chambers rotate with shaft 28, while the plates for the second chamber are stationary. Alternatively, the plates for the second chamber can be mounted on the inside of tubular wall 34 so that they, too, rotate with the shaft. Waste plastic, in particular, plastic waste, introduced through intake opening 8, is moved in a downstream direction (to the right as seen in FIGS. 1A and 2) and it enters first combustion chamber 12. Auger plates 40 in the first chamber distribute the material relatively evenly where it is liquefied, gasified and ignited by heat generated by friction and heat transfer via tubular wall 34. The resulting partially combusted waste plastic together with flames, smoke and other particulates generated in the first combustion chamber propagates in a downstream direction through second and third combustion chambers 14, 16 where the waste plastic burns so that substantially only smoke, gaseous matter and non-combustible particulates are then discharged into the discharge section 18 of the burner. Rotational discharge blades 19 swirl the exhaust gas flow, thus improving a flush-out of the incombustible materials from the burner. The discharge blades which provide a sufficient swirling of the incombustibles may be made in different shapes. One example is a substantially propeller shaped discharge blade.

A particular advantage provided by the waste burner of the present invention is that fresh combustion air is provided just upstream of each of the combustion chambers. Complete incineration of all the waste plastic takes time, thus feeding just sufficient air at the upstream end of each chamber helps to sustain optimal combustion therein. This, in turn, helps to maintain maximum temperature in each chamber, because combustion air that is needed further downstream in the process, namely in the second and third combustion chambers, does not travel through the chambers where it is not needed and need not be heated. In addition, the flow of relatively cool combustion air along the outside of the housing enhances energy efficiency because the air flow reduces heat losses from the combustion unit to the atmosphere, while at the same time preheating the air needed for the combustion in the combustion chamber.

Referring now to FIG. 2, air for incinerating waste plastics is supplied from a suitable source (or sources) at an air inlet 44, like, for example, a fan or a blower used to enhance the air intake. Air next enters inner air passage 46 defined by tubular double-walled housing portion 22. Some of the air in passage 46 is released into the space for conveyor screw 4 from an orifice 50, enters shaft lumen 6 via inlets 52, and continues to flow in the direction of combustion unit 10, while simultaneously cooling the transport screw, thus increasing the reliability of the screw and its bearings. The remainder of the air in the annular inner air passage 46 continues in a downstream direction and partially encircles first combustion chamber 12. A radial air passage 47 fluidically connects axially extending inner air passage 46 with axially extending outer air passage 48, which surrounds combustion unit 10 and discharge section 18 of the burner.

As shown in FIG. 2, air from the lumen is discharged via first, second and third sets of orifices 54 arranged, respectively, in the transition space between the first and second combustion chambers 12 and 14 and into discharge section 18 of the burner, as is further described below. Additionally, the air needed for burning the waste plastic is separately introduced into each of the three combustion chambers. Air flowing along air passage 46 is discharged into an upstream portion of first combustion chamber 12 via orifices 56. A further set of housing orifices 58 is arranged upstream of third combustion chamber 16 and extends from air passage 46 into the transition space between the second and third combustion chambers 14, 16. Instead of or in addition to orifices 58, radial air passage 47 can be provided with additional orifices such as, for example, orifices 60 located just upstream of third combustion chamber 16, as shown in FIG. 1. Air for the second combustion chamber 14 is introduced by the first set of orifices 54 (located on screw 4) into the transition space between the first and second combustion chambers and therefore also upstream of the second combustion chamber. The air flow through orifices 54, 56, 58 and 60 is suitably modulated to match the air flow rate to the amount of waste plastics introduced through intake opening 8.

To facilitate the incineration of waste plastic, particularly during the startup operations, an auxiliary burner 62 in the transition space between the second and third combustion chambers 14, 16 for heating all three chambers, either directly (chamber 16) or indirectly (chamber 12 via housing section 30 extending into the combustion unit and chamber 14 via tubular wall 34). The auxiliary burner 62 may be oil burner, gas burner, solid fuel burner, or electrical heater. The inventors have found that using the auxiliary burner for about 5 minutes preheats the waste plastic sufficiently to efficiently start the combustion.

Figure 3:
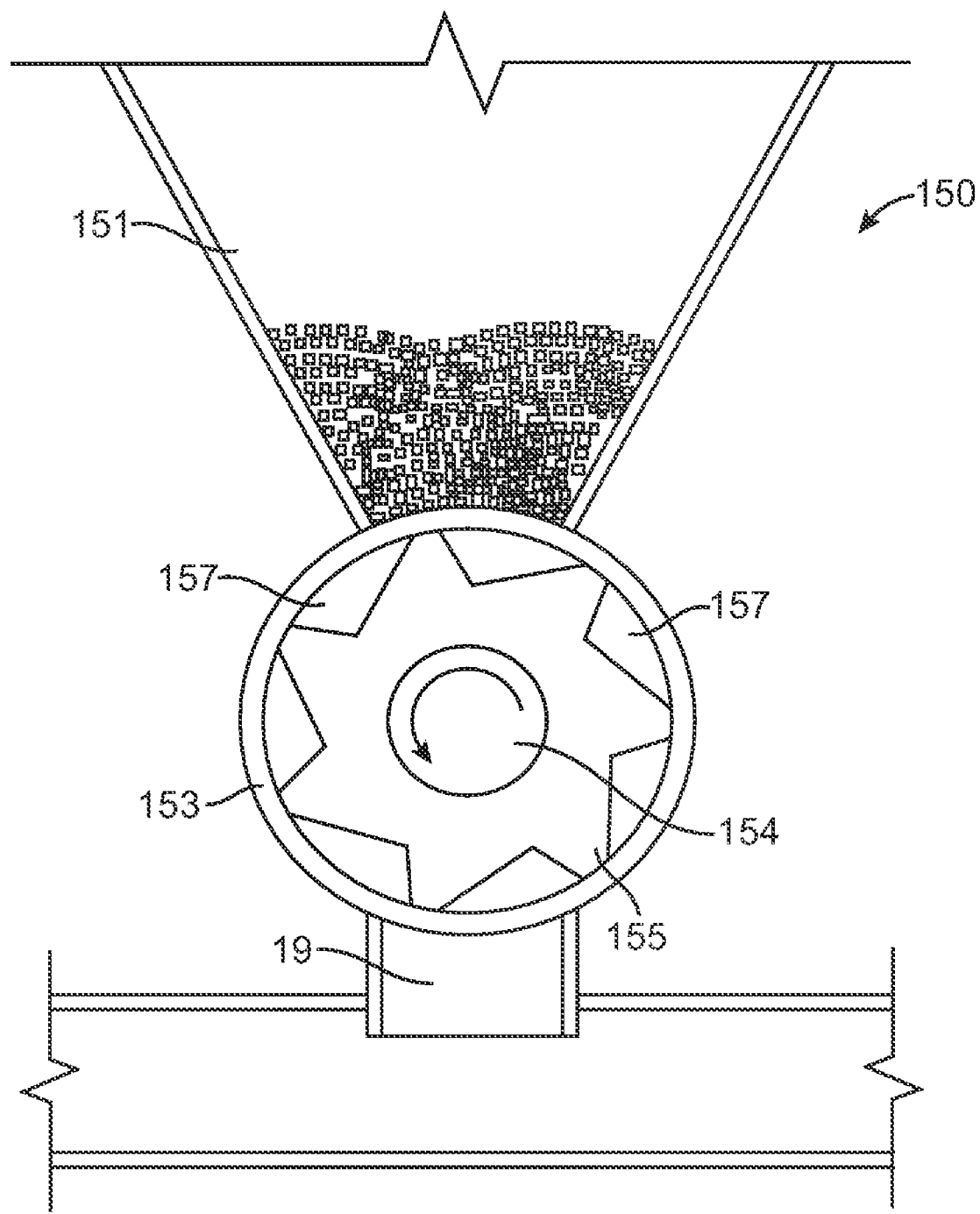
FIG. 3 shows a detail sectional view of the fuel supply unit.

Referring now to FIG. 3, a waste plastic supply unit 150 can be attached to the intake opening 8. Waste plastic is deposited in a fuel hopper 151, wherefrom it is gravitationally fed into rotator housing 153. A granular waste plastic is illustrated in the fuel hopper 151, but other constitutions of the waste plastic are possible. Rotation of a rotator 154 directs waste plastic towards the intake opening, and further toward the transport screw (not shown). The inventors have found that the rotator protrusions 155 having a triangle or a semi-circular shape work wall, but other rotator protrusion shapes can also be used. The inventors have also found that inclining the rotator protrusions 155 in the direction opposite from the direction of their rotation minimizes sticking of the waste plastic against the rotator housing 153.

The pollution emission of one embodiment of the invention was tested by the KTL (Korean Testing Laboratory) by measuring harmful gas emissions during the waste fuel burning. According to the tests, the dioxin level was 0.119 ng-TEQ/Sm3, the hydrogen chloride level was 0.78 ppm, and the sulfur oxides level was 6.60 ppm. Thus, these harmful gas emission levels were significantly below the Korean emission standard levels (dioxine: 5 ng-TEQ/Sm3, hydrogen chloride: 50 ppm, and sulfur oxides: 6.60 ppm), rendering the invention environmentally friendly.

The above description is illustrative and is not restrictive, and, as it will become apparent to those skilled in the art upon review of the disclosure, the present invention may be embodied in other specific forms without departing from the essential characteristics thereof. For example, while the above invention is described in conjunction with plastic waste fuel, the embodiments of the present invention can also be used with other solid fuels, waste or not, like, for example, coal, saw dust, wood chips, or a mixture of solid fuels. Furthermore, while three combustion chambers are described, a different number of combustion chambers may be used. These other embodiments are intended to be included within the spirit and scope of the present invention. The scope of the invention should, therefore, be determined not with reference to the above description, but instead should be determined with reference to the following and pending claims along with their full scope of equivalents.

What is claimed is:

1. A burner for waste plastics, comprising:
    a rotatable feed mechanism for directing the waste plastic to a combustion unit;
    said combustion unit having first, second and third combustion chambers in fluid communication with one another and substantially coaxially arranged with respect to the rotatable feed mechanism;
    wherein the first combustion chamber being arranged to receive waste plastic from the feed mechanism;
    an outlet for discharging exhaust materials from the third combustion chamber;
    wherein the combustion chambers have approximately like axial extents; and
    wherein the first through third combustion chambers are arranged radially one after the other so that the combustion unit has an overall axial length in the direction of the feed conveyor approximately equal to the length of an individual combustion chamber.

2. A burner according to claim 1 including a combustion air inlet orifice for each combustion chamber arranged upstream of the respective combustion chambers.

3. A burner according to claim 1 wherein each combustion chamber is radially spaced apart from other combustion chambers by inner and outer tubular walls.

4. A burner according to claim 3 wherein each combustion chamber is defined in part by a tubular wall that is common to two combustion chambers.

5. A burner according to claim 4 including radially oriented end walls arranged between adjacent combustion chambers and spaced apart from respective ends of the tubular walls for generating an S-shaped flow of combustible materials, combustion air, smoke and particulates from the first through the third combustion chambers.

6. A burner according to claim 5 wherein at least one of the end walls is rotatably fixed to the feed mechanism for rotation with the feed mechanism.

7. A burner according to claim 6 including auger blades fixed to the tubular walls for rotation therewith for advancing the work material and products of combustion through the combustion unit.

8. A burner according to claim 1 including a housing surrounding the feed mechanism and the combustion unit including an air flow passage extending over substantially the full extent of the housing, thus insulating the burner against the thermal losses to the environment.

9. A burner according to claim 8 including orifices located in the housing and communicating with the air flow passage of the housing for directing combustion air from the air flow passage in the housing to upstream ends of the combustion chambers.

10. A burner according to claim 1 wherein the feed mechanism includes a screw conveyor having a hollow interior extending axially along the conveyor and into the combustion unit for directing combustion air to the combustion unit, and one or more orifices disposed radially from the longitudinal hollow interior and axially located on the screw conveyor so that the orifices discharge air to at least one combustion chamber.

11. A burner according to claim 1 including discharge blades attached with the feed mechanism for swirling combustion gases and flushing non-combustible material out of the burner.

12. A burner according to claim 1 including an auxiliary burner configured to start burning of waste plastic.

13. A burner according to claim 12, wherein said auxiliary burner is selected from a group consisting of oil burner, gas burner, solid fuel burner, and electrical burner.

14. A burner according to claim 1 including a fuel hopper configured to provide waste fuel to the feed mechanism.

15. A burner according to claim 14, wherein the fuel hopper comprises a rotator configured to rotate substantially inside a rotator housing, said rotator further comprising a plurality of rotator protrusions inclined opposite from the direction of the rotator's rotation, thus reducing the incidence of waste fuel sticking to a rotator housing as waste fuel approaches the feed mechanism.

16. A burner according to claim 15, wherein the rotator protrusions have substantially triangular shape.

17. A burner according to claim 15, wherein the rotator protrusions have substantially semicircular shape.

18. A burner for waste plastics, comprising:
    a screw conveyor configured to revolve around its longitudinal axis, said screw conveyor having a longitudinal hollow interior for air distribution and a plurality of radially disposed air intake orifices connecting the hollow interior to combustion chambers, thus providing air for combustion process;
    one or more auger blades disposed substantially spirally around a portion of length of the screw conveyor, said auger blades being configured to move waste plastics along the longitudinal axis as the screw conveyor revolves;
    a first combustion chamber disposed substantially centrally around the screw conveyor and around at least one orifice connecting the longitudinal hollow interior with the outer surface of the screw conveyor;
    a second combustion chamber disposed substantially concentrically around the first combustion chamber and configured to receive burning waste fuel from the first combustion chamber, the second combustion chamber being in fluidic communication with at least one air intake orifice disposed on a housing and configured to provide air for the waste plastic burning; and a third combustion chamber disposed substantially concentrically around the second combustion chamber and configured to receive waste plastic from the second combustion chamber, the third combustion chamber being fluidic communication with at least one air intake orifice disposed on the housing and configured to provide air for the waste plastic burning.

19. A burner according to claim 18 including discharge blades attached with a feed mechanism for swirling combustion gases and flushing non-combustible material out of the burner.

20. A burner according to claim 18 including an air blower configured to provide air for waste plastic burning.

21. A burner according to claim 18 including an auxiliary burner configured to start burning of waste plastic.

* * * * *